Dec. 3, 1957 S. J. McKNIGHT 2,814,879
DISTANCE MEASURING DEVICE
Filed April 26, 1956 2 Sheets-Sheet 1
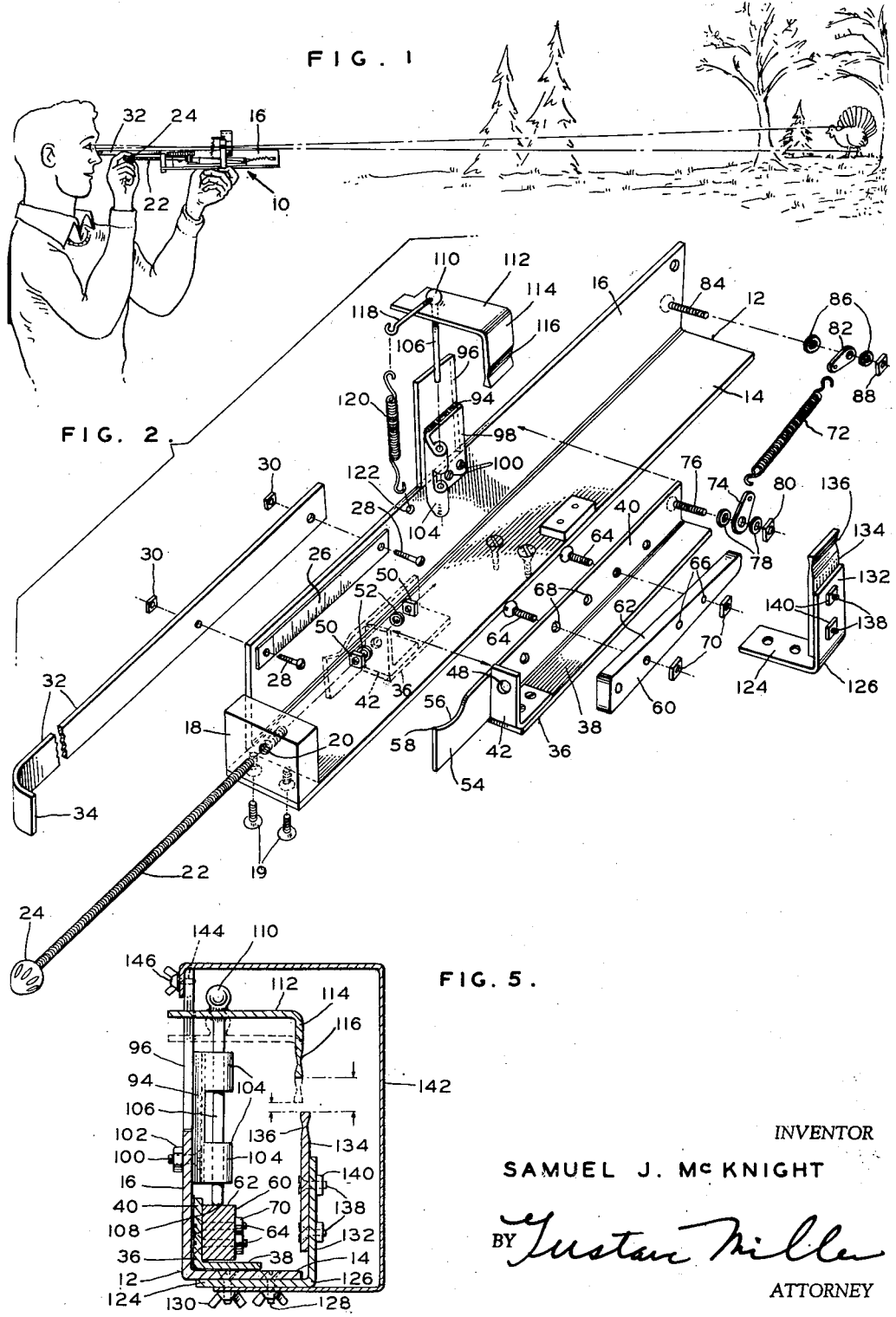
INVENTOR
SAMUEL J. McKNIGHT
BY Gustav Miller
ATTORNEY Dec. 3, 1957  S. J. McKNIGHT  2,814,879
DISTANCE MEASURING DEVICE
Filed April 26, 1956  2 Sheets-Sheet 2

INVENTOR
SAMUEL J. McKNIGHT
BY *Gustave Miller*
ATTORNEY

United States Patent Office 2,814,879
Patented Dec. 3, 1957

2,814,879

DISTANCE MEASURING DEVICE

Samuel J. McKnight, Elkatawa, Ky.

Application April 26, 1956, Serial No. 580,799

7 Claims. (Cl. 33—64)

This invention relates to a measuring instrument, and it particularly relates to an instrument for measuring distances without having to use a tape or chain.

It is one object of the present invention to provide a measuring instrument of the above type which is very simple in construction and very easy to use by anyone.

Another object of the present invention is to provide a measuring instrument of the above type which, although simple in construction and light in weight, is extremely accurate and is capable of accurately measuring distances and lining up the sights of the instrument with an object by simple, straight-line manipulative movements.

Other objects of the present invention are to provide an improved measuring instrument, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a side elevational view of an instrument embodying the present invention, the instrument being shown in use.

Fig. 2 is an exploded view of the instrument of Fig. 1.

Fig. 5 is a sectional view of the instrument taken on line 5—5 of Fig. 4.

Figure 3:
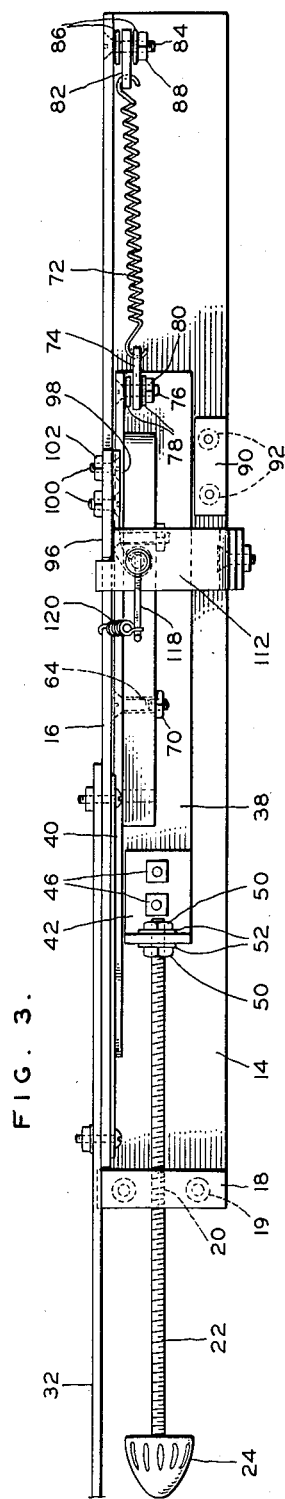
Fig. 3 is a top plan view of the instrument of Fig. 1.
Figure 4:
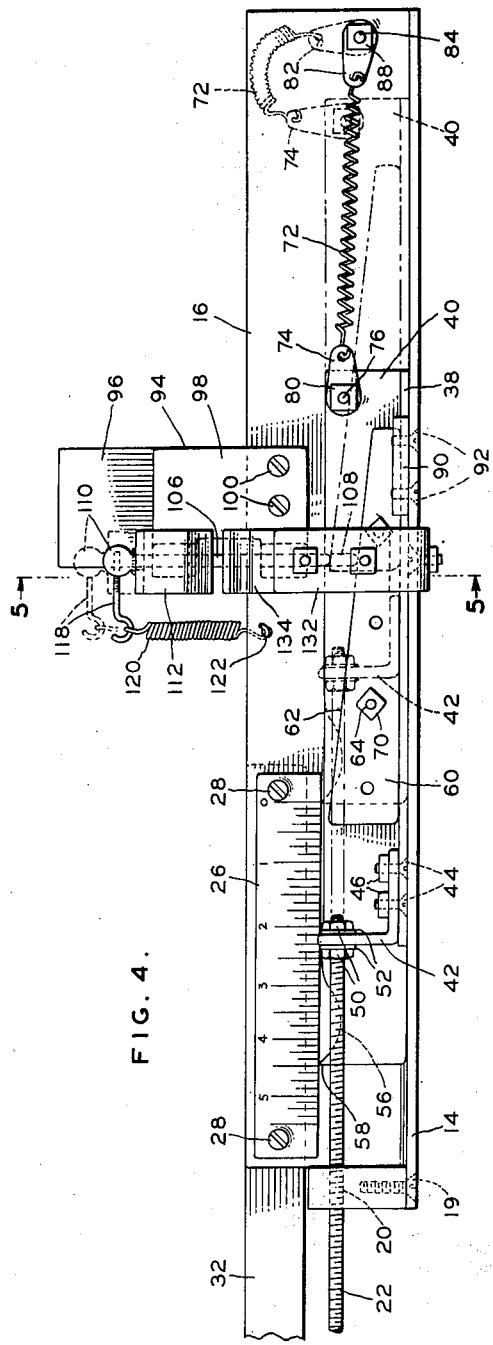
Fig. 4 is an enlarged, detailed, side elevational view of the instrument of Fig. 1.

Referring now in greater detail to the drawings wherein similar reference characters refer to similar parts, there is shown a measuring instrument, generally designated 10, which comprises a base 12 in the form of an angle-bar having a horizontal flange 14 and an upstanding vertical flange 16. At one end of the angle-bar 12 is provided a block 18 which is supported on the horizontal flange 14 by means of screws 19. The portion of flange 14 which supports block 18 extends beyond the edge of the vertical flange 16 to such a distance that the block 18 abuts against the edge of the vertical flange, as clearly shown in Figs. 2 and 3.

The block 18 is provided with a threaded bore 20 through which extends an elongated, threaded shaft or bolt 22 having a knob 24 at its outer end. The bolt 22 is threadedly engaged within the bore 20 so that it is longitudinally adjustable relative to the block 18 upon being screwed through the bore 20 in one direction or the other.

On the vertical flange 16, adjacent the block 18, is provided a linear scale 26 in the form of a plate which is bolted to the vertical flange by means of bolts 28 and nuts 30. These same nuts and bolts also simultaneously act to clamp a flat rod 32 to the opposite side of the vertical flange 16. This flat rod extends substantially beyond the end of the angle-bar and even beyond the knob 24 on the adjusting bolt 22, and terminates in a laterally curved end portion 34.

Slidably positioned on the angle-bar 12 is a slide member 36 which is also in the form of an angle-bar having a horizontal flange 38 and a vertical flange 40. A generally L-shaped plate 42 is provided at one end of the horizontal flange 38 and is connected thereto by bolts 44 and nuts 46 connecting the horizontal arm of the L-shaped plate to the horizontal flange 38. A hole 48 is provided in the vertical arm of the L-shaped plate 42 and in this hole is engaged the inner end of the bolt 22, as by means of nuts 50 and washers 52. An extension of the vertical flange 40 is provided at 54. This extension is provided with a recess 56 in its upper edge, this recess defining a pointer 58 which is adapted to co-act with the linear scale 26.

Fixedly mounted within the slide member 36 is a cam bar 60. This cam bar has a straight bottom portion which seats flatly on the horizontal flange 38 of the slide member. However, the upper edge of the cam bar is inclined from a high point at the rear of the bar to a low point at its front, this inclined edge forming the cam surface 62. The cam bar is connected to the slide member by means of bolts 64 which extend through mating holes 66 and 68 in the bar 60 and vertical flange 40 respectively. Nuts 70 hold the bolts in place.

A coil spring 72 is connected at one end to a link 74 which is pivotally connected to the slide member 36 by a bolt 76 extending through the vertical flange 40 of the slide member at the forward end thereof. Washers 78 and nut 80 hold the link on the bolt. The opposite end of the spring 72 is connected to a link 82 pivotally connected to the forward end of vertical flange 16 of the angle-bar 12 by means of a bolt 84, washers 86 and nut 88.

The slide member and its associated structure is held on the angle-bar 12 by means of a guide-block 90. This block is connected to the horizontal flange 14 by means of screws 92. This block acts as both lateral guide and lateral stop for the slide member.

Mounted on the vertical flange 16 of the angle-bar 12 is a bracket 94 which comprises a plate 96 having its lower edge supported on the edge of vertical flange 16, and a plate 98 connected to it, plate 98 having a lower portion which extends over the front surface of the flange 16 and is connected thereto by bolts 100 and nuts 102. The plate 98 is provided with an offset guide member 104 through which extends a rod 106 having a cam follower 108, adapted to bear on cam surface 62, at its lower end, and a knob 110 at its upper end. The knob 110 acts as a stop to prevent rod 106 from falling through the guide member. It also acts to bear against an L-shaped metal strip 112 which is mounted on the rod 106. The vertical arm 114 of strip 112 is indented or notched adjacent its lower end, as at 116 to define the square-shaped lower end of the sight-marker and to keep off glimmer. A hook 118 extends from the knob 110 and supports the upper end of a coil spring 120, the lower end of which is hooked through a hole 122 in vertical flange 16. This spring 120 acts to bias the cam follower 108 at the lower end of rod 106 against the cam surface 62 of the cam bar.

Connected to the horizontal flange 14 of the angle-bar 12 is the horizontal arm 124 of a bracket 126, this connection being by means of bolts 128 and wing nuts 130. The vertical arm 132 of the bracket 126 supports a metal strip 134 having indentations or notches 136 defining the squared-off lower sight-marker and also acting to eliminate glimmer. Both the upper and lower sight-markers are preferably burned black with match smoke to eliminate blurring.

The strip 134 is connected to bracket 132 by means of bolts 138 and nuts 140. The two markers, upper and lower, are offset from each other, as best shown in Fig. 5, in order to better define the object seen in the gap between the markers.

If desired, a metal strip 142 is provided around the sight-marker to act as a shield against glare. This strip 142 is connected to the angle-bar 12 by the same wing-nuts 130 and bolts 128 as are used to hold the bracket 126, and by a bolt 144 and wing nut 146 which connect it to plate 96.

The scale 26 is calibrated to correspond to predetermined linear distances from the sights. This is accomplished by using a certain type of target, such as the turkey illustrated in Fig. 5, and then measuring the distance with a tape between the target and the sights. At 100 yards, the gap between the sight-markers is opened to just encompass the target, as in Fig. 5. The position of the point 58 on the scale 26 is then marked as being the 100 yard marker. This procedure is repeated with the same target for distances of 200 yards, 300 yards, etc. If desired, instead of repeating this procedure each time, the distance on the scale between the 100 yard and 200 yard marks is measured and then a corresponding interval is used on the scale between each succeeding mark. The measured distances may, of course, be calibrated in any other desired intervals other than 100 yards.

It is, of course, to be understood that this method of calibration makes a certain scale plate good only for a particular target or object. The scale 26 marked for a turkey would, therefore, not be effective for a bear. It is, therefore, necessary to calibrate different plates 26 for different targets. These plates are then made separable from the instrument so that they may be attached as required and then replaced by another plate corresponding to a different target. The series of plates can be sold with the instrument and merely made interchangeable by means of bolts 28.

The point 58 not only acts as a pointer on the scale to indicate the distance of the target but also interrupts the gap between the markers to act as a sight. This pointer 58 moves with the slide member 36 to designate the distance of the target on the scale. At the same time, the cam surface 62 acts to move the upper sight-marker 112 either up or down, depending on the direction of movement of the slide member. This is accomplished through vertical movement of rod 106 as its cam pointer end moves over cam surface 62. In this manner, when the slide member is moved toward the operator, the gap between the sight-markers is made smaller to correspond to the greater distance away of the target; while moving the slide member away from the operator makes the gap larger to correspond to the smaller distance away. Movement of the slide member is accomplished by rotation of bolt 22 which is manipulated by knob 24. During this sighting procedure, the end portion 34 of bar 32 is held against one of the operator's eyes in order to space his eyes the correct distance from the sights.

Instead of using a bolt adjustment means, it is also possible to use a slide bar. Such a slide bar could be round and have a key-way and key connection with the bore 20 in block 18. The bore would, in such case, not be threaded. The slide bar could, furthermore, be made square in cross-section so that it acts as its own key within a square bore to prevent the undesirable relative rotation. Such a slide bar could be actuated by hand and could be kept in a set position by a set-screw or the like. This type of adjustment is, in some instances, preferable to the screw type since it is much faster. However, it may not be quite as accurate.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A distance measuring device comprising an angle-bar serving as a base, said base angle-bar having a horizontal and a vertical flange, a bracket mounted on the vertcial flange of said base angle-bar, a movable sight-marker supported by said bracket, a slide member supported on the horizontal flange of said base angle-bar, means guidingly holding said slide member on said base angle-bar, a bearing block at one end of the base angle-bar, a threaded bore in said bearing block, an elongated, threaded shaft extending through said threaded bore in threaded engagement therewith, said threaded shaft being connected to said slide member, a cam surface on said slide member, a cam follower connected to said movable sight-marker and arranged in coacting relationship to said cam surface, and a fixed sight mounted on said base angle-bar in cooperative relationship to said movable sight-marker.

2. The device of claim 1 wherein a linear scale is provided on said base angle-bar and a coacting pointer is provided on said slide member.

3. The device of claim 1 wherein means are provided to resiliently urge said slide member in one direction away from said bearing block.

4. The device of claim 1 wherein a spacer bar extends from said base angle-bar in a position to space the operator's eyes from said sight-markers.

5. The device of claim 1 wherein a shield is provided around said sight markers to prevent glare in the area of the sight-markers.

6. The device of claim 1 wherein said slide member is an angle-bar fitting within said base angle-bar, there being a cam block having an inclined upper surface mounted on said slide member, and a pointer extending beyond said cam block, said pointer being arranged to coact with a linear scale on said base angle-bar.

7. The device of claim 1 wherein said cam follower is biased toward said cam surface by a resilient biasing means connected to said base angle-bar.

References Cited in the file of this patent

UNITED STATES PATENTS

| | | |
|---|---|---|
| 53,420 | Daly | Mar. 27, 1866 |
| 840,904 | Bump | Jan. 8, 1907 |
| 2,152,880 | Dowdy et al. | Apr. 4, 1939 |
| 2,164,463 | Mather | July 4, 1939 |